Oct. 15, 1957    J. B. HOWZE    2,809,723
PARKING BRAKE
Filed Feb. 23, 1955    2 Sheets-Sheet 2
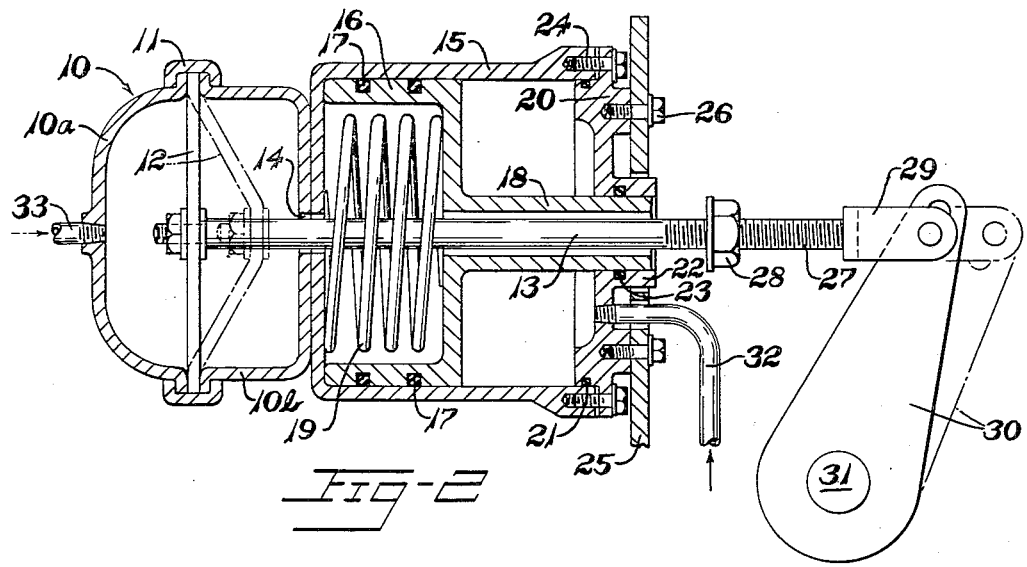
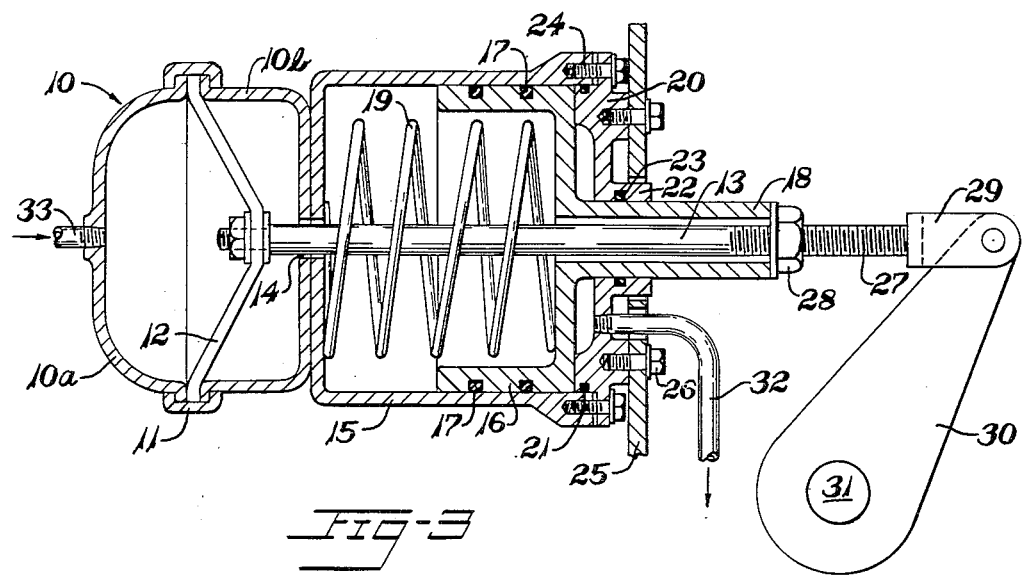
INVENTOR.
JAMES B. HOWZE
BY Malcolm W. Fraser
ATTY.

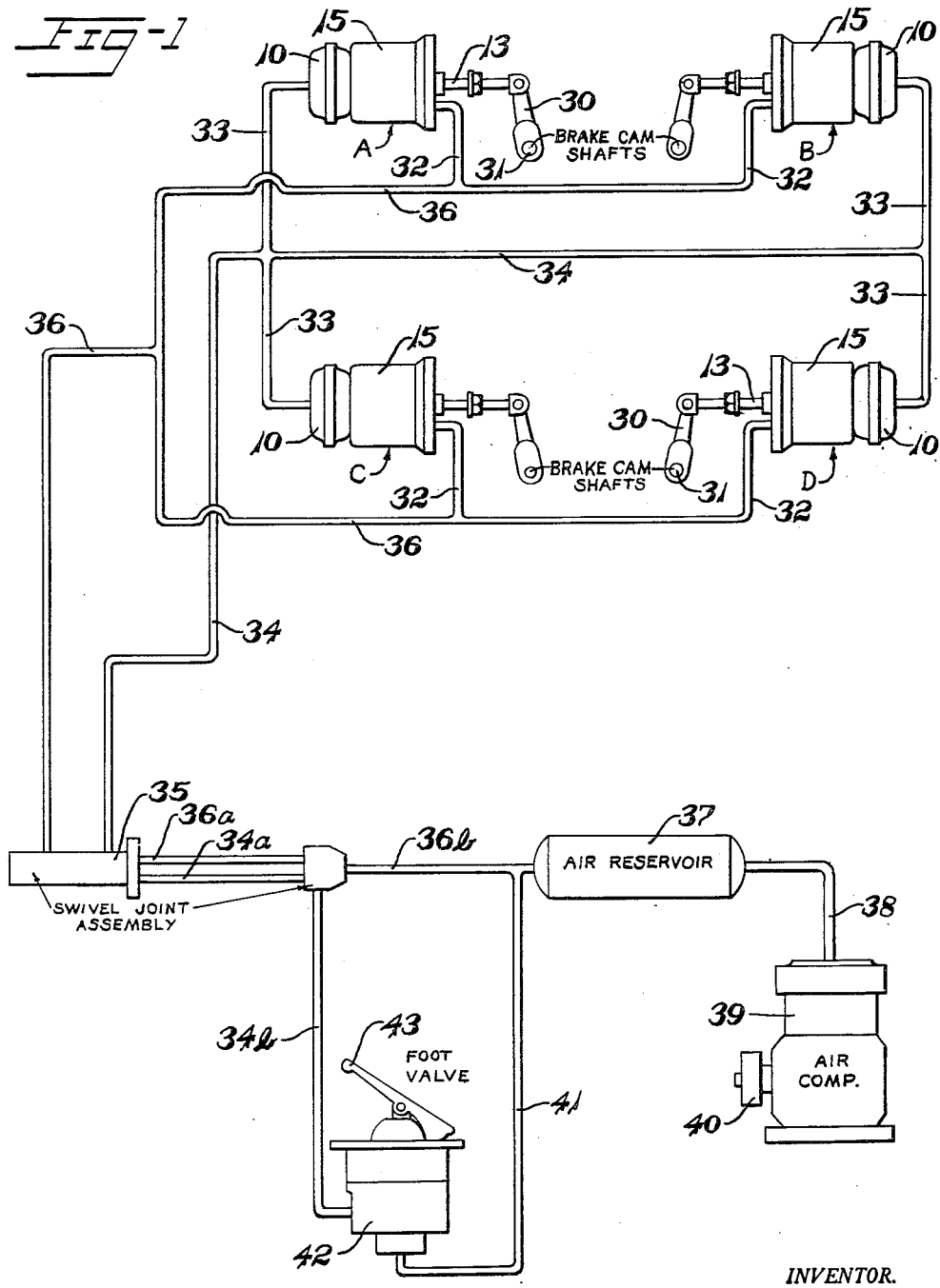

2,809,723

Patented Oct. 15, 1957

2,809,723

PARKING BRAKE

James B. Howze, Norwalk, Calif., assignor, by mesne assignments, to Insley Manufacturing Corporation, Indianapolis, Ind., a corporation of Indiana Application February 23, 1955, Serial No. 490,018

5 Claims. (Cl. 188—106)

This invention relates to vehicle brake mechanism, but more particularly to fluid operated vehicle brakes, in which the brakes may be automatically applied in the event of reduction of fluid pressure.

An object is to produce a new and improved brake actuating mechanism associated with usual brake applying device and which employs a spring normally rendered ineffective by pressure fluid which becomes effective automatically in the event of failure of or reduction in the pressure exerted by the pressure fluid.

Another object is to improve the structure, assembly and operation of auxiliary brake actuating mechanisms of this type for increasing the safety factor and providing a commercially feasible and economical unit which will satisfy the demands of service.

Other objects and advantages of the invention will hereinafter appear, and for purposes of illustration, but not of limitation, an embodiment of the invention is shown on the accompanying drawings, in which Figure 1 is a diagrammatic view of a brake system for vehicles showing four brake actuator units and tube connections from the various units leading to an air reservoir which in turn is connected to a compressor, a foot pedal being indicated for simultaneously applying the brakes of the several units;

Figure 2 is an enlarged longitudinal sectional elevation of one of the brake actuator units showing the pneumatic means for applying the respective brake in response to the action of the foot pedal and also showing the parking or safety brake in the position it assumes under the influence of compressed air; and Figure 3 is a view similar to Figure 2, but showing the safety or parking brake device in its "on" or operative position.

In accordance with one aspect of this invention, there is provided a brake unit for each of the wheels of the vehicle such as a trailer, these units being pneumatically operated. Associated with the manually operated portion of each unit is an automatic safety or parking brake which is normally subjected to the same air pressure as is employed for operating the brakes manually. This air pressure is sufficient to maintain the auxiliary brake device in its inoperative position. However, in the event of failure of the compressed air supply, or that the air pressure should drop below a predetermined minimum, then the auxiliary brake element automatically operates to apply the brake and hold the brake in its applied position until the air pressure returns to its normal or predetermined degree. Thus, when the vehicle is parked and the air pressure is reduced or completely turned off, the auxiliary devices operate automatically to apply the brakes and hold the vehicle stationary until the air pressure is again brought up to the desired degree. Also, should a leakage in the system develop so that the air pressure drops below a predetermined degree while the vehicle is in transit, the brakes are automatically applied, thus affording a safety factor.

Referring particularly to Figures 2 and 3, each brake unit has an air brake cylinder 10 formed of two parts 10a and 10b, each part being outwardly flanged to clamp therebetween a rubber diaphragm 12, an annular band 11 being crimped over the flanged portions of the cylinder parts to secure them in place. Connected centrally to the diaphragm 12 and projecting therefrom through registering openings 14 in the air cylinder part 10b and the bottom wall of a cupped-shaped auxiliary cylinder 15, is a brake actuating rod 13. Manifestly, upon the introduction of air under pressure into the cylinder part 10a, the diaphragm 12 is flexed, as indicated by the broken lines on Figure 2, for imparting longitudinal movement to the rod 13 for brake applying purposes.

It will be observed that the auxilary cylinder 15 is of slightly greater diameter than that of the main cylinder 10 and flatly abuts thereagainst. Preferably, the abutting walls of these cylinders are secured together in any suitable manner, as by welding. Reciprocable within the auxiliary cylinder 15 is a piston 16 which is generally cup-shaped and is provided with suitable packing 17 to provide a fluid-tight seal with the walls of the cylinder. The closed end of the piston 16 is formed with an elongate tubular extension 18. Socketed within the piston and bearing at one end against the end wall of the cylinder and at the other end against the bottom wall of the piston 16 is a helical coiled spring 19 which is of a predetermined strength. For example, if the air pressure employed is sixty pounds per square inch, then the coil spring 19 should be of such strength that the air pressure overcomes the spring and holds the piston in its left-hand position (Figure 2), but upon any reduction of such pressure, then the spring 19 is of sufficient force to force the piston 16 abruptly to the right of the figure, for applying the brake, as will hereinafter be described.

Closing the open end of the auxiliary cylinder 15 is a plate 20, a portion of which telescopes within the cylinder and is provided with a packing 21 for providing a fluid-tight seal with the walls of the cylinder. Projecting outwardly from the central portion of the closure plate 20 is a boss 22 with which the piston extension 18 has a sliding fit, there being a packing 23 for sealing the boss and piston extension, thereby to retain within the auxiliary cylinder the air under pressure. It will be observed that the mouth portion of the auxiliary cylinder 15 is enlarged to enable a series of cap screws 24 to secure the closure plate to the auxiliary cylinder. 25 represents a suitable bracket plate to which the brake unit is attached, a series of attaching screws 26 extending through the bracket plate and into an enlarged portion of the closure plate 20 enabling the brake unit conveniently to be mounted in the desired position upon the vehicle.

It will be observed that the brake actuating rod 13 projects freely through the tubular extension 18 and has a screw-threaded end portion 27 on which is mounted a stop nut 28. Mounted on the end of the shaft 13 is a clevis 29 which is suitably attached to the free end portion of a brake operating arm 30, which in turn is fixed at its opposite end to a brake operating cam shaft 31. Description and illustration of the vehicle wheel brake mechanisms are not considered necessary since they form no part of the present invention. Suffice it to say that rocking movement of the arm 30 in a clockwise direction (Figure 2) rocks the shaft 31 to apply the brakes, the brakes being released upon actuation of the shaft 31 in a counterclockwise direction to substantially the full-line position shown on Figure 2.

Extending through a suitable aperture in the bracket plate 25 and suitably connected to the closure plate 20 is a tube 32 for supplying air under pressure to the interior of the auxiliary cylinder 15 for actuating the piston 16 to hold it in the position shown on Figure 2. Also extending to the main brake cylinder 10 and in this instance entering centrally through the part 10a is a tube 33 which is adapted to supply air under pressure for manually controlling the applying of the brakes as above mentioned.

Referring to Figure 1, four brake operating units are shown, these being generally designated by the letters A, B, C and D. All of the tubes 33 from these brake cylinders are connected to a master tube or line 34 which extends to a two-part swivel joint assembly 35 of any suitable design. The tubes 32 from the several auxiliary cylinders 15 connect to a common tube or master line 36 and also extend to the swivel joint assembly as indicated. The two parts of the swivel joint assembly are connected by tubes 34a for conveying air under pressure to the master line 34, and 36a for conveying air under pressure to the master line or tube 36. A tube 36b leads from an air reservoir 37 for conveying air under pressure to the tube 36a. The air reservoir 37 in turn is connected by a tube 38 to an air compressor 39 which is driven from a pulley 40. The pulley may be driven in any suitable manner.

A tube 41 branches from the tube 36b and is for the purpose of conveying air under pressure to a valve unit 42 of any suitable or desired structure. The valve unit 42 is actuated by a foot pedal 43, the structure being such that upon depression of the foot pedal 43, air under pressure from the reservoir 37 passing through the tube 41 is delivered to a tube 34b which extends to the swivel joint assembly and is in communication with the tube 34a.

In operation, it will be understood that the operator of the vehicle may depress the pedal 43 and thus simultaneously deliver air under pressure to each of the cylinders 10 of the units A, B, C and D, thereby to apply the brakes in the manner above indicated. In case the pressure within the air reservoir falls below a predetermined maximum selected to be sufficient to overcome the coil springs 19 of the auxiliary units, then the springs 19 operate to move respectively the brake operating shafts 13 outwardly by engagement of the end of the tubular extension 18 with the stop nut 28, thus simultaneously and automatically applying the several brakes. The stop nut 28 can be moved to the desired position according to the movement of the actuating shaft 13 necessary for the application of the brakes. Thus, so long as there is sufficient air pressure within the reservoir 37, the auxiliary units are inoperative. It is only upon failure of or reduction in the air pressure, that the auxiliary units operate.

Numerous changes in details of construction, arrangement and operation may be effected without departing from the spirit of the invention, especially as defined in the appended claims.

What I claim is:

1. Brake actuating mechanism comprising a closed housing, a flexible diaphragm within said housing and peripherally secured in place, means for introducing fluid under pressure to said housing at one side of said diaphragm, a brake applying rod fixed to an intermediate portion of said diaphragm and projecting from the opposite side thereof through the adjacent end of said housing for reciprocatory movements to and from a brake applied position, an auxiliary cylinder connected to said adjacent end of said housing and having apertured end walls through which said rod extends, a cup-shaped piston slidably fitting said cylinder with the open end thereof facing toward said housing, a coiled compressing spring seating within the open end of the piston and having the opposite end abutting the end wall of the cylinder adjacent said housing normally to urge the piston toward the other end of the cylinder, a tubular extension projecting from the closed end of the piston through the other end wall of the cylinder, said brake applying rod extending freely through said tubular extension, means providing between said outer end wall of the cylinder and said tubular extension a fluid-tight seal but enabling sliding movements of said extension, means for introducing fluid under pressure to the other end of said cylinder between said other end and the closed end of the piston, and an abutment on said actuating rod exterior of said cylinder and so positioned on the rod that, upon failure of or predetermined reduction in fluid pressure, the coiled spring actuates the piston causing the end of the tubular extension to engage the abutment and move said rod to said brake applied position.

2. The combination claimed in claim 1, said abutment being adjustable lengthwise along said rod, whereby the point at which said abutment is engaged by said extension may be adjustably predetermined.

3. The combination claimed in claim 1, the outwardly projecting end portion of said rod being screw threaded, said abutment comprising a nut threadedly engaged on said screw-threaded portion.

4. The combination claimed in claim 1, the said adjacent end wall of said housing through which said rod extends abutting said one end wall of said cylinder and having an aperture aligned with the aperture in said housing wall for passage of said rod, the said other end wall of said cylinder being formed by a detachable closure plate.

5. The combination claimed in claim 4, and an outwardly extending integral pad on said plate enabling attachment of the assembly to a support.

References Cited in the file of this patent
UNITED STATES PATENTS

| | | |
|---|---|---|
| 512,790 | Bachman | Jan. 16, 1894 |
| 1,524,426 | Farmer | Jan. 27, 1925 |
| 2,211,890 | Farmer | Aug. 20, 1940 |
| 2,282,615 | Spalding | May 12, 1942 |
| 2,409,908 | Simpkins | Oct. 22, 1946 |
| 2,726,738 | Fawick | Dec. 13, 1955 |
| 2,754,805 | Beman | July 17, 1956 |
| 2,757,763 | Burger | Aug. 7, 1956 |